Sept. 2, 1952 — O. J. POUPITCH — 2,608,735
QUICK FASTENING DEVICE
Filed Feb. 7, 1945 — 2 SHEETS—SHEET 1
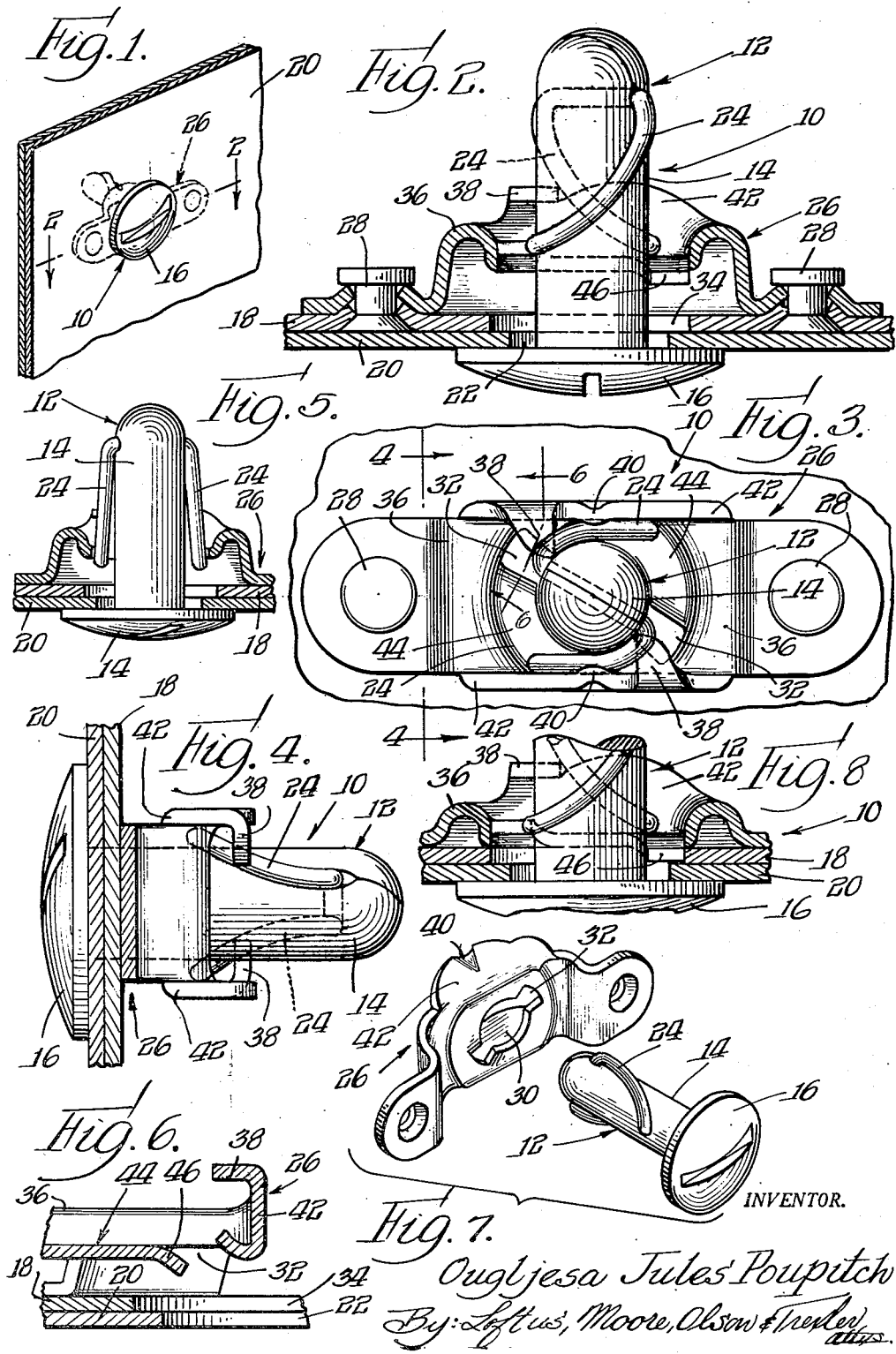
INVENTOR.
Ougljesa Jules Poupitch
By: Loftus, Moore, Olson & Trexler Sept. 2, 1952   O. J. POUPITCH   2,608,735
QUICK FASTENING DEVICE
Filed Feb. 7, 1945   2 SHEETS—SHEET 2
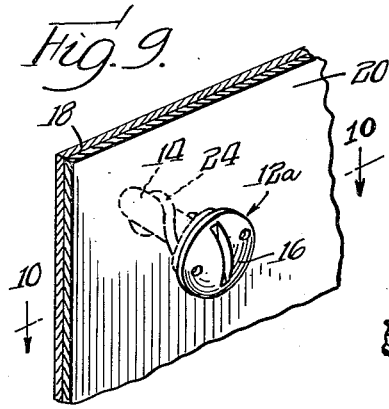
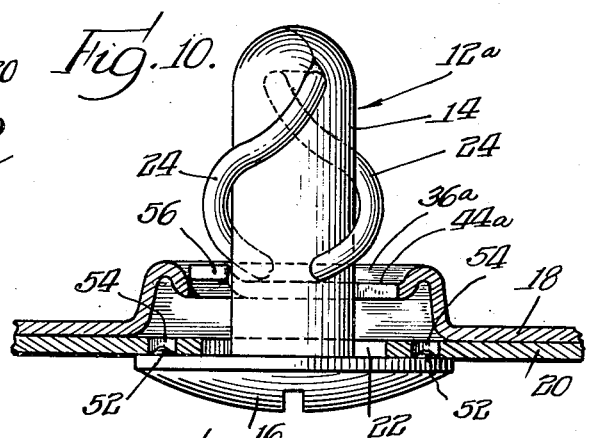
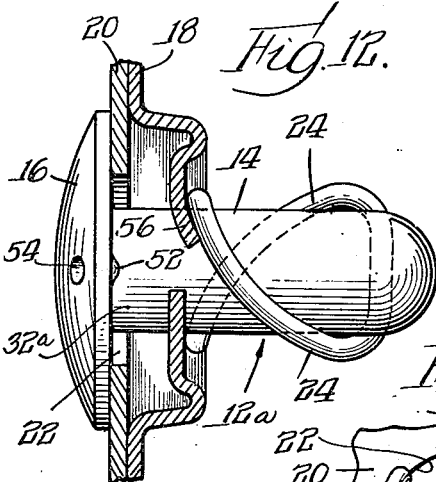
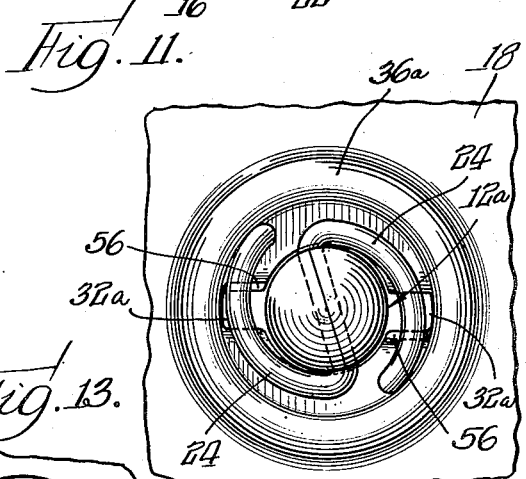
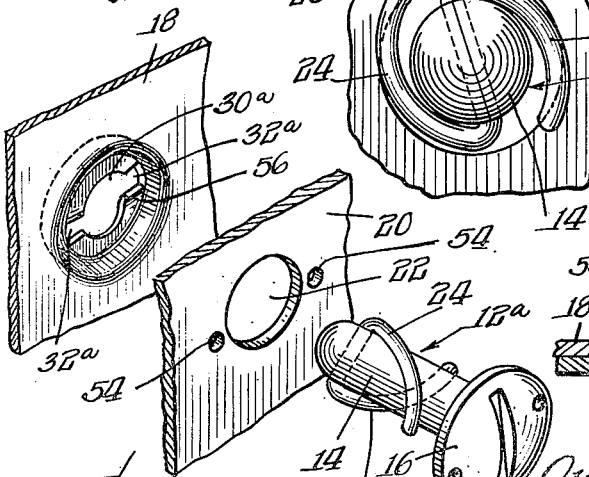
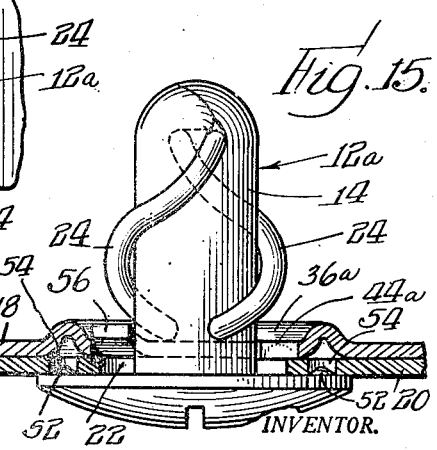
INVENTOR.
Ougljesa Jules Poupitch
By: Loftus, Moore, Olson & Trexler
Attys.

Patented Sept. 2, 1952

2,608,735

UNITED STATES PATENT OFFICE 2,608,735

QUICK FASTENING DEVICE

Ougljesa Jules Poupitch, Chicago, Ill., assignor to Illinois Tool Works, Chicago, Ill., a corporation of Illinois Application February 7, 1945, Serial No. 576,592

20 Claims. (Cl. 24—221)

This invention relates generally to fasteners of the rotary type wherein a stud is employed to rotatably engage a clamping surface with a lateral lug, and more particularly to fastener devices in which the stud member is of novel and inexpensive design.

Fastener devices adapted to quickly attach and detach sheet metal parts, such as cowling parts of an airplane, have heretofore been used extensively in certain fields. Generally speaking, most of these cowl fasteners have employed, as one element thereof, a relatively expensive sheet metal stamping. It has also been common practice to use, in association with such sheet metal stampings, a stud member equipped with a rigid lateral lug for engaging a cam-like surface on the sheet metal fastener part. The present invention proposes the use of a fastener of simple yet durable construction which precludes the necessity of employing expensive sheet metal stampings as well as high cost stud members. To this end the present invention contemplates a quickly operable fastener device which incorporates a stud member of novel and efficiently operable design having a plurality of resilient arms carried by the stud member.

Another object of the present invention is to provide a fastener device in which a rotary stud member is equipped with resilient arms adapted to extend helically along the peripheral surface of the stud toward the stud head with free extremities of the arms adapted to yieldably clamp work pieces together.

More specifically the invention contemplates a quickly operable fastener device of the type referred to above wherein the resilient arms of the stud member may be stressed or flexed into helical form as the stud is rotated within registering apertures of the work pieces.

Another object of the present invention is to provide a fastening device having the general form referred to above in which means is provided adapted to engage the resilient arms and thereby secure the stud against inadvertent and unintentioned loosening.

Still more specifically, the invention contemplates a fastener in which a novel fastener stud is employed having arms constructed of a length of wire secured at its intermediate portion within the stud body and having opposite extremities of the wire bent into superimposed relation with respect to the stud periphery to provide free extremities positioned externally of the stud for resiliently and lockingly engaging a clamping surface.

The objects referred to above as well as other conveniences and advantages will be apparent from the following description when considered in connection with the accompanying drawings wherein:

Figure 1 is a perspective view of a fastener constructed in accordance with the teachings of the present invention, shown in operative association with two work sheets or cowling parts;

Figure 2 is an enlarged horizontal sectional view taken substantially along the line 2—2 of Figure 1;

Figure 3 is a rear view of the device as illustrated in Figure 2;

Figure 4 is a vertical sectional view taken at right angles to the device as shown in Figure 3, said view being taken substantially along the line 4—4 of Figure 3;

Figure 5 illustrates the manner in which the fastener stud may be initially associated with the cowling parts before applying rotation to the stud;

Figure 6 is an enlarged fragmentary detailed sectional view taken substantially along the line 6—6 of Figure 3 to more clearly illustrate the cam and abutment structure;

Figure 7 is a perspective exploded view of the fastener device illustrating the stud detached from the sheet metal stamping;

Figure 8 is a partial view similar to Figure 2 illustrating the manner in which the entire stamping part of the fastener device is positioned adjacent the inner work piece or sheet;

Figure 9 is a perspective view similar to Figure 1 disclosing a modified fastener device applied to a pair of work sheets;

Figure 10 is a view taken substantially along the line 10—10 of Figure 9, the stud member being shown in elevation and the associated work sheets being shown in section;

Figure 11 is a plan view of the device as illustrated in Figure 10;

Figure 12 is a sectional view taken at right angles of the device as shown in Figure 10;

Figure 13 is a plan view of the device as shown in Figure 10 when it is disassociated from one of the work pieces, said view disclosing the manner in which the resilient stud arms project radially outward a sufficient distance to prevent inadvertent disassociation of the stud member from its associated work piece;

Figure 14 is an exploded view of the three parts illustrated in Figure 9, the resilient arms of the fastener being helically preformed; and Figure 15 discloses a modified fastener arrangement wherein the locking portion of the inner work piece or sheet is substantially coincident with the plane of said sheet.

Referring now to the drawings more in detail, wherein like numerals are employed to designate similar parts throughout the various figures, it will be seen that the fastener device of the present invention is designated generally by the numeral 10, Figures 1 to 7 inclusive. This fastener device includes a rotary stud structure designated by the numeral 12, said stud comprising a shank portion 14 and a head 16 provided at one extremity thereof. The stud is disclosed in association with pair of work pieces or cowling parts, namely, an inner part 18 and an outer part 20. The stud 12 is designed to be held within an aperture 22 of the outer work piece or sheet 20.

Particular attention is directed to a pair of resilient work engaging or latching arms 24 supported at the entering extremity of the stud shank 14. In the disclosed embodiment the stud shank is bifurcated at the entering extremity so as to accommodate and impinge the intermediate portion of a length of wire. The portions of the wire extending from opposite sides of the shank provide the above mentioned resilient arms 24.

In the embodiment disclosed in Figures 1 to 7 inclusive, the stud structure is disclosed in operative association with a companion stamping designated generally by the numeral 26 which is permanently secured to the inner work sheet by means of rivets 28. The central portion of the stamping is apertured so as to provide an opening 30, Figure 7, for receiving the stud shank 14 and radial openings 32 communicating with the central opening 30 for accommodating the resilient latching arms 24. This opening 30 in the stamping 26 registers with a larger opening 34 in the work sheet 18, Figure 2. As the stud is telescopically associated with the registering apertures 30 and 34, the arms 24 of said stud pass through the radial openings 32. Arcuate ribs 36, struck up from the plane of the stamping 26 serve to limit the lateral or radial deflection of the free extremities of the arms 24 beyond a limited extent.

Prior the association of the stud with the work piece 18 and stamping 26, the arms 24 may occupy either the straight undeflected relation as illustrated in Figure 5 or may be preformed into a helix as illustrated in Figure 7. With the stud arms 24 occupying the position as illustrated in Figure 5, wherein they are shown straight or undeflected, subsequent rotation of the stud causes the lower extremities of the arms to engage the stamping 26 in the vicinity of the radial openings 32 so that the arms ultimately assume the helical position shown in Figures 2 and 3. In this position each arm becomes lodged between an abutment 38 on one side and a dimple or protuberance 40 on the other side. The dimple 40 may be made by indenting a side section or wall 42 bent upwardly from the margin of the stamping 26. The arms 24 are adapted to snap past the protuberance 40 as they reach the limit of their rotation thereby preventing inadvertent or unintentional loosening of the stud. The abutments 38 constitute extensions from the upper margin of a companion side wall 42.

It will also be noted that as the free extremities of the arms rotatably pass from the radial openings or recesses 32 into engagement with arcuate surfaces 44, Figure 6, they must initially pass over a downwardly bent section 46. This section 46 serves to facilitate the initial deflection or bending of the arms. To reduce the force required to impart retrograde rotation to the stud, the free extremities of the arms 24 may be slightly rounded. However, in instances where increased resistance to retrograde rotation is desired, the arms may be provided with edges designed to bite into the surfaces 44.

The resilient arms 24 of the stud in Figure 7 are bent into the disclosed shape prior to association with the work. As these arms turn with the stud shank they must be further deflected in order for the extremities thereof to slide along the arcuate surfaces 44. It is this additional bending or flexing of the arms 24 which causes them to exert a strong clamping force. The arms 24, as illustrated in Figure 5, are deflected or bent into helical form during or as an incident to the rotation of the stud within the stamping. In each instance the stud arms are preferably deflected radially outwardly at their free extremities so as to secure the stud within its complementary outer work piece 20. It will be noted in Figure 5 that the arms 24 normally flare outwardly towards their free extremities so as to overlie the stock of the work piece 20 defining the margin of the aperture 22. Thus when the stud is telescopically associated with the aperture 22 of the work piece 20, the arms 24 will flex inwardly sufficiently to permit passage of the stud but will automatically spring outwardly when the arms clear the work piece, thereby securing the stud against unintentioned detachment from the work sheet. It is common practice to employ a plurality of fasteners of this type with a complementary series of apertures in a work sheet or cowling part. It is important that these studs, at all times, be held within the work piece or cowling part in readiness for quick association with or detachment from the complementary aperture of the other fixed work part.

In Figures 1 to 7 inclusive a stamping 26 is disclosed, the central portion of which is spaced from the plane of the fixed or inner work sheet 18. The purpose of this spaced relation is to insure disengagement of the extremities of the resilient stud arms 24 from the stamping. Not infrequently, quickly detachable fasteners of the type described are supported as a group by the outer detachable work sheet 20. Therefore it is essential that the free extremities of each resilient stud arm becomes completely detached from its companion stamping upon partial reverse rotation to the stud. After all of the studs have been loosened the outer plate 20 may be completely removed from association with the inner plate. In instances where a single fastener stud is employed this problem is not presented because reverse rotation applied to the stud causes it to be disengaged from the inner work piece and the outer work piece can be simultaneously moved as a unit with the stud.

In Figure 8 the stamping is slightly modified in that the central portion thereof is not spaced from the plane of the inner work piece 18, thus, as reverse rotation is imparted to the stud, the free extremities of the stud arms are soon brought into engagement with the inner surface of the work piece 20. Further rotation of the stud causes the work piece 20 to become separated from the work piece 18. In instances where two separable work pieces or sheets are secured together by a single stud, the structural arrangement disclosed in Figure 8 may be employed. However, when a plurality of fasteners are associated with a single detachable work sheet the form of stamping shown in Figures 1 to 7 is recommended.

In Figures 9 to 14 inclusive a modified fastener device is shown. The stud member, as illustrated in these figures, is similar to the stud 12 previously described with the exception of a pair of protuberances 52 formed on the clamping side of the stud head. The stud, in Figures 9 to 14 inclusive, is designated generally by the numeral 12a and all of its constituent portions are given identifying numerals corresponding to the numerals employed in describing stud 12.

The stud 12a is first associated with the outer work piece 20 by inserting it through the aperture 22. The stud arms 24 normally flare outwardly to the position shown in Figure 13 so that after the stud has been completely inserted within the sheet 20 the free extremities of the arms over-lie the work. In this manner the stud is secured against inadvertent detachment or loss from the work piece or cowling part 20. The inner work part 18 is provided with an aperture 30a corresponding to the aperture 30 of the stamping 26 previously described. Radial recesses 32a, like the previously described recesses 32, are designed to accommodate the resilient arms 24.

As the stud 12a is rotatably associated with the aperture 30a of the work piece 18 the free extremities of the resilient arms 24 engage the material of the sheet 18 adjacent the recesses 32a and are helically sprung so as to exert a resilient yet firm clamping action against the annular arcuate surfaces 44a. It will be noted that the plane of the surfaces 44a is spaced from the plane of the work piece 18. The arms are prevented from springing radially outwardly by the annular rib 36a extruded from the sheet 18. After the stud has been rotated slightly less than 180°, the protuberances 52 on the stud head 16 are brought into registration with companion apertures 54, Figures 10 and 14. The resilient or spring action of the arms 24 causes these protuberances to automatically interlock with apertures 54 and thus secure the stud against inadvertent rotation. In the disclosed embodiment the protuberances 52 are tapered so as to enable disengagement of said protuberances from their complementary apertures 54 when sufficient rotative force is applied to the stud. In other words, the interlocking of the protuberances 52 and apertures 54 is sufficient to prevent unintentioned loosening of the stud but will permit retrograde rotation when detachment of the stud from the work piece 18 is required.

The material of the work piece 18 on one side of each of the recesses 32a is bent outwardly at 56, Figures 10 and 12, so as to facilitate disengagement of the free extremities of each of the arms 24 as they are rotated in the direction of loosening (clockwise as viewed in Figure 11). As these free extremities of the arms 24 approach the radial recesses 32a, the outwardly turned portions 56 serve to guide and direct these free extremities into the radial recesses and thus facilitate retrograde movement of the stud. That is to say, the outwardly turned portions 56 serve as deflectors to prevent the extremities of the stud arms from passing over the radial recesses.

From the foregoing it will be apparent that the device shown in Figures 9 to 14 inclusive precludes the necessity of providing an auxiliary or separate stamping part such as the stamping 26 shown in Figures 1 to 7 inclusive. Also the extent to which the work piece 18 is preformed to accommodate the stud 12a does not involve the use of complicated or expensive dies. In certain instances it may only be necessary to provide a simple opening consisting of a central aperture and radial recesses. This will enable the rotative entrance of the stud and the subsequent deflection of the stud arms so as to firmly clamp the work sheets together. By having the locking arrangement in the stud head, the necessity of providing stops or abutments for directly engaging the stud arms is avoided. Hence the present invention contemplates a quickly operable fastener device which may be produced with the utmost of economy and which may be used without necessitating an expensive preforming operation upon either of the work pieces.

In Figure 15, a slightly modified fastening arrangement is disclosed. The structure of Figure 15 is similar in every respect to the device shown in Figures 9 to 14 except that the extruded locking portion is not spaced from the plane of the work sheet 18. The device of Figure 15, like the device of Figure 8, is particularly adapted to be used in instances where work sheets are designed to be secured together by a single stud. As previously pointed out, in connection with the description of Figure 8, the locking portion which cooperates with the free extremities of the resilient arms need not be spaced from the plane of the inner or fixed work sheet when only a single stud is employed. Under such circumstances the outer work sheet may be moved away from the fixed sheet or plate immediately upon registration of the extremities of the arms with the radial recesses 32a.

One of the important advantages resulting from the present invention resides in the adaptability of a stud of a given size to be used with work of various thicknesses. This is accomplished by employing the resilient stud arms which are deflected or stressed as an incident to the rotative association thereof with the work piece. If the thickness of the work piece is increased over that disclosed in the drawing, the stud arms will deflect to a greater extent. Conversely if the thickness of the work piece is less the degree of deflection of the arms is proportionately less. This advantage constitutes a distinct advancement over cowl fasteners heretofore employed for a predetermined thickness of stock wherein a rigid lateral lug of a rotary stud member is designed to cooperate with a cam surface associated with the work. It will also be apparent that lateral shifting or deflection of the stud is resisted by stresses within the portion of the wire material which traverses the stud shank. The extent of such resisting stresses would of course be dependent upon a number of factors such as the rigidity of the wire stock and the configuration of that portion of wire which traverses the stud shank.

In the disclosed embodiment of the invention the distance between the free extremities of the stud arms and abutment surface provided by the stud head is normally less than the overall thickness of the work for which the stud is designed to be used. As shown in the drawing, the lateral work engaging abutment provided by the underside of the stud head is located at one extremity of the stud shank. However, the invention contemplates positioning a lateral abutment at any point along a shank in cooperative relationship with the free extremities of the deflectable or laterally shiftable stud arms. In some applications it may be necessary to employ a shank of considerable length and in such instances the lateral abutment may be positioned intermediate the end of the shank.

For purpose of illustration certain specific structural embodiments have been disclosed herein but obviously the invention is not limited to these embodiments but is capable of other modifications and changes without departing from the spirit and scope of the appended claims.

The invention is hereby claimed as follows:

1. A quickly attachable and detachable fastener adapted to be inserted through an apertured work structure of a given thickness for clamping the opposed work surfaces thereof and including a rotary stud member having a shank portion, a lateral work engaging abutment spaced from one end of said shank portion for clampingly engaging one of the work surfaces, an elongated latching arm of firm resilient material for clampingly engaging an opposed work surface and having one extremity thereof secured to said shank portion with the opposite extremity thereof being free and extending toward said abutment, the said free extremity terminating externally of the periphery of said shank portion a distance from said abutment less than the predetermined given thickness of the work structure in the vicinity of the aperture therethrough when in normal unclamped position, said latching arm being extended longitudinally of the shank and without the encirclement thereof adapting the stud for substantially axial projection through the work aperture, and whereby upon stud rotation the said free extremity of the latching arm is stressed to yieldingly coact with said lateral abutment in clamping the work surfaces therebetween, said latching arm when in clamping position having a curvature defined by its resiliency in reaction to forces at the opposite ends thereof.

2. A quickly attachable and detachable fastener adapted to be inserted through an apertured work structure of a given thickness for clamping the opposed work surfaces thereof and including a rotary stud member having a shank portion, a lateral work engaging abutment spaced from one end of said shank portion for clampingly engaging one of the work surfaces, a pair of elongated latching arms of firm resilient material for clampingly engaging an opposed work surface, said arms being oppositely and symmetrically disposed in respect to the shank and each having one extremity thereof secured to said shank portion with the opposite extremity thereof being free and extending toward said abutment, the said free extremities terminating externally of the periphery of said shank portion a distance from said abutment less than the predetermined given thickness of the work structure in the vicinity of the aperture therethrough when in normal unclamped position whereby upon stud rotation the said free extremities of the latching arms are stressed to yieldingly coact with said lateral abutment in clamping the work surfaces therebetween, and said latching arms when in clamping position having a curvature defined by their resiliency in reaction to forces at the opposite ends thereof.

3. A quickly attachable and detachable fastener adapted to be inserted through an apertured work structure of a given thickness for clamping the opposed work surfaces thereof and including a rotary stud member having a shank portion, a lateral work engaging abutment spaced from one end of said shank portion for clampingly engaging one of the work surfaces, a pair of elongated latching arms of firm resilient material for clampingly engaging an opposed work surface, said arms being oppositely and symmetrically disposed in respect to the shank and each having one extremity thereof secured to said shank portion with the opposite extremity thereof being free and extending toward said abutment, the said free extremities terminating externally of the periphery of said shank portion a distance from said abutment less than the predetermined given thickness of the work structure in the vicinity of the aperture therethrough when in normal unclamped position, said latching arms being extended longitudinally of the shank and without the encirclement thereof adapting the stud for substantially axial projection through the work aperture, and whereby upon stud rotation the said free extremities of the latching arms are stressed to yieldingly coact with said lateral abutment in clamping the work surfaces therebetween, said latching arms when in clamping position having a curvature defined by their resiliency in reaction to forces at the opposite ends thereof.

4. An article of sale comprising a stud provided with a transverse aperture and at the outer end with means for rotating the stud; and a resilient stiff hard elastic wire having a yoke part in said aperture and two arms emerging from opposite ends of the aperture and extending at least partly around the stud and toward the outer end.

5. A fastening device adapted to be secured to a plate-like structure having a hole therethrough, the margin of the hole at the inner face of the structure having opposite marginal notches and exposed engagement portions therebetween; said device comprising a stud rotatably disposable in said hole and provided at the outer end with a head engageable with the outer face of the structure; the inner end portion of the stud being remote from said structure and having stiff arms thereon joining the stud at said end portion and disposed slightly helically longitudinally of the stud at opposite sides of the stud and extended toward said head and having free engagement ends engaged with said exposed face of said engagement portions to hold the device and structure together; said arms being closely adjacent to the stud and out of contact with said inner member except at said engagement ends, the outer longitudinal face of said arms most remote from the stud being intermediately out of contact with any structure; said arms being short and stiff enough and sufficiently nearly straight and sufficiently nearly parallel to said stud, when the arms are thus longitudinally disposed and intermediately out of contact to hold said stud and structure together with a force of many pounds; said arms on assembly of the structure on the stud being adapted to pass into said notches, and on rotation of the stud in said opening being adapted to be disposed slightly helically and to yieldably cam from the notches to cause said engagement ends to engage the exposed face of said engagement portions to hold the stud in place and the stud and structure together.

6. A stud element adapted to be secured in a hole in a plate-like structure, the margin of the hole having opposite marginal notches and exposed engagement portions therebetween at the inner face of said structure, said stud element comprising a stud rotatably disposable in said hole and provided at the outer end with a head engageable with the outer face of the structure and having a transverse aperture in its inner portion remote from said structure; a stiff elastic wire locking member having its middle part in said aperture and having stiff elastic arms disposed slightly laterally offset longitudinally of the stud at opposite sides of the stud and extended toward said head and having free engagement ends forcibly engaged with the exposed face of said engagement portions; said arms being out of contact with said inner member except at said engagement end; said arms being short and stiff enough and sufficiently nearly straight and sufficiently nearly parallel to said stud when the arms are thus longitudinally disposed, and near enough to the stud where the arms join said middle part to hold said stud and structure together with a force of many pounds; said engagement ends being adapted, on rotation of the stud, to slide from said engagement portions to allow the arms to move through the notches to release the structure from the stud and outer member; said arms on assembly of the structure on the stud and on rotation of the stud in said opening being adapted to be disposed slightly laterally offset and to yieldably cam from the notches to allow said engagement ends to engage the exposed face of said engagement portions to hold the stud in place and the members together.

7. A fastening device for securing together rigid superposed outer and inner metal plate members having coaxial holes therein, the plates being in rigid contact with each other at said holes and throughout, the margin of the hole of the inner member having opposite marginal notches and exposed engagement portions therebetween; said device comprising a stud rotatably disposable in said holes and provided at the outer end with a head engageable with the outer face of the outer member and having a transverse aperture in its inner end portion remote from said members; a wire locking member having its middle part in said aperture and having laterally offset exterior parts at opposite sides of the stud and having engagement parts forcibly engaged with the inner plate at the exposed face of said engagement portions; said exterior parts being closely adjacent to the stud and out of contact with said inner member at all parts of the locking member between said engagement parts and said middle parts; said exterior parts when thus laterally offset being unyielding enough intermediately and near enough to the stud where they join said middle part to hold the plates together with a force of many pounds; said engagement parts being adapted on rotation of the stud, to engage and press upon said engagement portions to hold the stud in place and press the members together.

8. A fastening device adapted to be secured to a plate-like structure having a hole therethrough, the margin of the hole at the inner face of the structure having opposite marginal notches and exposed engagement portions therebetween; said device comprising a stud rotatably disposable in said hole and provided at the outer end with a head engageable with the outer face of said structure and having a transverse aperture in the inner end portion of the stud; a stiff elastic locking member having its middle part held in said aperture and having stiff elastic exterior parts extending along the stud and having engagement parts forcibly engaged with the exposed face of said engagement portions; said exterior parts being closely adjacent to the stud and out of contact with said structure except at said engagement parts, and out of pressure contact with any structure except at said middle part and said engagement portions, said exterior parts being stiff enough and near enough to the stud where they join the stud to hold said stud and structure together with a force of many pounds; said exterior parts on assembly of the plates on the stud being adapted to pass into said notches and on rotation of the stud in said openings being adapted to yieldably engage said engagement portions and cam from the notches to allow said engagement parts to engage and press upon the exposed face of said engagement portions to hold the stud in place and force the stud and structure together.

9. An article of sale comprising a stud provided near the inner end with a transverse aperture and at the outer end with a tool-receiving head providing means for rotating the stud; locking means partly in said aperture and comprising stiff hard elastic side members at opposite sides of the stud extending toward the head; the parts of said side members nearest the head being resiliently movable relative to each other.

10. A fastening device comprising a stud provided at the outer end with a tool-receiving head; a portion of the stud remote from said head having arms thereon, said arms being stiff, elastic and slightly yieldable and disposed at opposite sides of the stud extended toward said head.

11. A fastening device as defined in claim 10, wherein said arms are provided on the stud as separate elements, each arm being connected to the stud at one of the arm ends.

12. A fastening device as defined in claim 10, wherein said arms are provided on the stud as separate elements, each arm being connected to the stud at one of the arm ends, there being cooperative means on the stud and arms to maintain the opposite free ends of the arms extended toward the stud head.

13. A fastening device as defined in claim 10, wherein said arms are provided on the stud as separate elements, each arm being connected to the stud at one of the arm ends, portions of the stud body gripping the arms at the connected ends thereof to anchor the connected arm ends fixedly to the stud.

14. A quickly attachable and detachable fastener as defined in claim 1, wherein the shank portion of the stud member clampingly engages the secured extremity of the arm to hold the arm with its opposite extremity in extending position.

15. A quickly attachable and detachable fastener as defined in claim 1, wherein the secured arm extremity extends generally radially from the stud shank portion, the arm being bent substantially right-angularly to provide its free opposite extremity extending toward the stud shank abutment.

16. A quickly attachable and detachable fastener as defined in claim 2, wherein the shank portion of the rotary stud member is provided with a substantially imperforate entering end, the secured extremities of the arms being substantially in juxtaposition thereto.

17. An article of sale as defined in claim 9, wherein said locking means comprises a length of substantially round wire, the wire portion within said aperture being gripped thereby to hold the wire immovably within said stud aperture.

18. A quickly attachable and detachable fastener as defined in claim 1, wherein the lateral work engaging abutment of the shank portion is provided with a locking protuberance for engagement with the work structure to prevent the unauthorized loosening of said fastener.

19. A fastening device as defined in claim 10, wherein said arms are disposed slightly helically of the stud when in initial position, prior to application to a work piece.

20. An article of sale as defined in claim 9, wherein the stud is bifurcated between said aperture and the entering stud end, the bifurcations gripping the locking means portion disposed within said aperture to hold said locking means in fixed position in respect to the stud body.

OUGLJESA JULES POUPITCH.

REFERENCES CITED

The following references are of record in the file of this patent:

UNITED STATES PATENTS

| Number | Name | Date |
|---|---|---|
| 838,203 | Neil | Dec. 11, 1906 |
| 2,121,784 | Busby | June 28, 1938 |
| 2,373,380 | Cameron | Apr. 10, 1945 |
| 2,410,441 | Hattan | Nov. 5, 1946 |

FOREIGN PATENTS

| Number | Country | Date |
|---|---|---|
| 234,549 | Great Britain | May 28, 1925 |
| (Corresponding U. S. Pat. 1,648,855 Nov. 8, 1927) | | |
| 423,706 | Germany | Jan. 11, 1926 |
| 566,857 | Great Britain | of 1945 |